Figure 1:
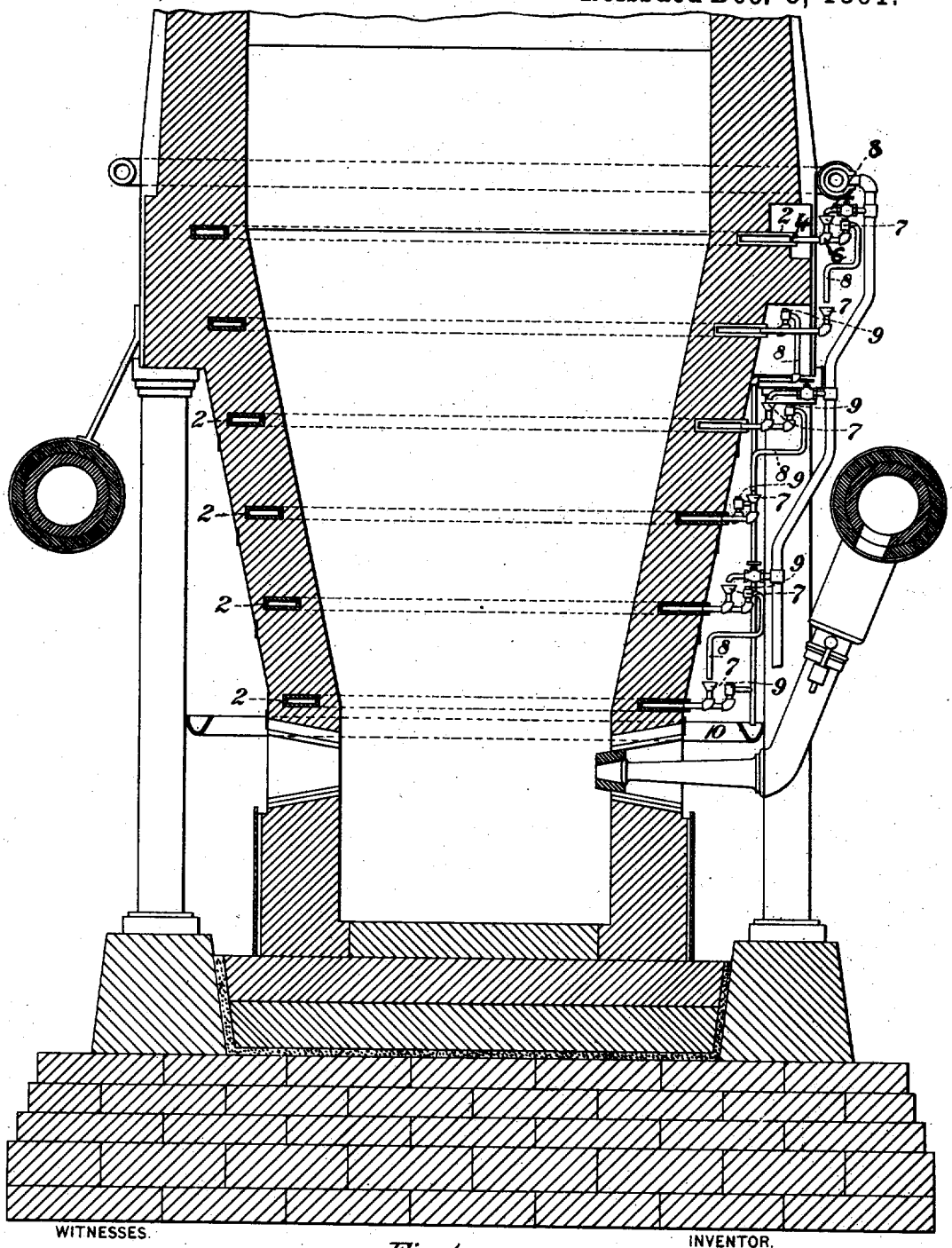

2 Sheets—Sheet 1.

T. M. POLLOCK.

FURNACE BOSH PLATE.

No. 11,209. Reissued Dec. 8, 1891.

WITNESSES.

W. B. Conner

H. L. Gill

INVENTOR.

Thomas M. Pollock by W. Bakewell & Sons his Attorneys

THE NORRIS PETERS CO., PHOTO-LITHO., WASHINGTON, D. C.

2 Sheets—Sheet 2.
T. M. POLLOCK.
FURNACE BOSH PLATE.
No. 11,209. Reissued Dec. 8, 1891.
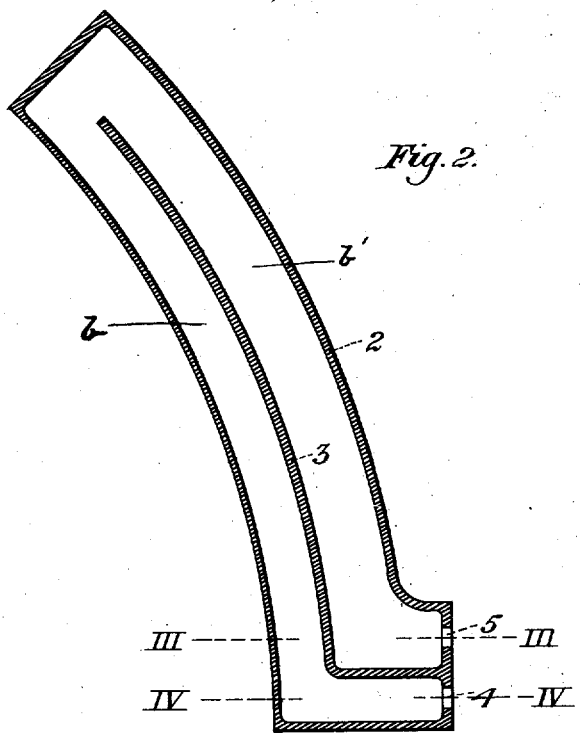
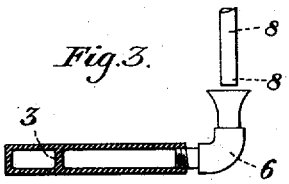
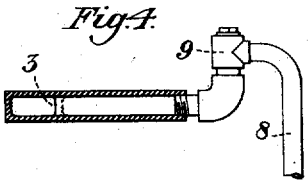
WITNESSES.
W. B. Corwin
H. L. Gill
INVENTOR.
Thomas M. Pollock
by W. Baxewell & Sons
his Attorneys.
THE NORRIS PETERS CO., PHOTO-LITHO., WASHINGTON, D. C.

UNITED STATES PATENT OFFICE.

THOMAS M. POLLOCK, OF BRIAR HILL, OHIO.

FURNACE BOSH-PLATE.

SPECIFICATION forming part of Reissued Letters Patent No. 11,209, dated December 8, 1891.

Original No. 450,636, dated April 21, 1891. Application for reissue filed August 12, 1891. Serial No. 402,481.

*To all whom it may concern:*

Be it known that I, THOMAS M. POLLOCK, of Briar Hill, in the county of Mahoning and State of Ohio, have invented a new and useful Improvement in Furnace Bosh-Plates, of which the following is a full, clear, and exact description.

Heretofore bosh-plates for cooling the walls of blast-furnaces, &c., have consisted of metal plates or castings provided with water-passages having water supply and discharge pipes connected thereto, and the plates are generally connected in series, so that the water shall flow from one to the other. When in use and subjected to the great heat of the furnace, the plates are apt to burn out, so as to permit the water to leak from them into the furnace, and this by chilling the interior of the furnace produces irregularity in its working, and is often the occasion of serious damage.

The chief objection to former bosh-plates is that they afford no ready means for detecting the occurrence of such leaks, and even when abnormal working of the furnace seems to indicate the existence of a leak its exact locality often cannot be determined without spending considerable work in uncoupling the connections and testing the various bosh-plates.

It is the object of my invention to remedy these defects and to provide a bosh-plate which will not burn out readily and which affords ready means for detecting the occurrence of leaks.

The invention is illustrated in the accompanying drawings, in which—

Figure 1 is a vertical section of part of a blast-furnace provided with my improved bosh-plates. Fig. 2 is a horizontal sectional view of one of the bosh-plates. Fig. 3 is a vertical cross-section on the line III III of Fig. 2, and Fig. 4 is a similar section on the line IV IV of Fig. 2.

Like symbols of reference indicate like parts in each.

The bosh-plate 2 is a hollow metal casting having a diaphragm or partition 3, which extends from the front end nearly to the rear end, and at its front end curved outwardly, so that when set in a furnace-wall the inlet and discharge holes 4 5 at that end shall be outwardly directed.

The diaphragm in the casting constitutes a two-branch continuous passage *b b'*, which extends from the front to the back of the bosh-plate, and thence in the reverse direction and in parallel course to the front. The plate is built horizontally in the furnace-wall in the usual manner, and in order to provide for the circulation of water through it I attach to the inlet-opening 4 an elbow pipe or connection 6, having an open upwardly-directed (preferably funnel-shaped) mouth 7, and I set the supply-pipe so that its end 8' shall be directed toward the funnel-mouth and so that it shall be adapted to discharge water freely into the latter. The novelty of this arrangement of the water connections is that the supply-pipe is not tightly coupled with the bosh-plate, but so that the inlet of the latter is open, so that the water can be poured into it.

The discharge-opening of the bosh-plate is provided with a pipe 9, which extends upwardly and is open at its upper end, and a discharge-pipe 8 leads downwardly from the side of the pipe, as shown in Fig. 3.

For the sake of economy in arranging the different bosh-plates in the furnace-wall I prefer to set the ends of the several discharge-pipes 8 directly above the mouths 7 of the respective bosh-plates, so that the discharge-pipe of one plate shall serve as the supply-pipe of the plate below, from which lower plate the water flows through the discharge-pipe into a gutter 10 or other place of discharge.

The operation of the bosh-plate is as follows: Water from a suitable elevation or head is admitted into the supply-pipe and flows from its end 8' into the funnel-mouth 7 of the bosh-plate, and thence through the pipe 6 into and through the recurrent water-passage *b b'*, and finally escapes through the pipe 9 into the discharge-pipe 8. By reason of the fact that the parts 7 and 9 are open at the top the course of the water through them can be seen and noted, and as the pipe 9 extends somewhat above the level of the mouth of the pipe 8 the water is prevented from escaping through the open end of the former. If there should be a leak in the bosh-plate, its presence will frequently be revealed by steam and gas bubbling up through the open ends of the parts 7 and 9; but if this does not occur its presence can be determined readily by shutting the valves of the supply and discharge pipes. Then if there be any leak in the bosh-plate the level of the water will fall quite rapidly, and this fact can be noted at the open ends of 7 and 9.

Another important advantage which results from my invention is that as the water is not supplied to the bosh-plate at high pressure, but simply flows into it, it will not rapidly force itself through any leaks which may occur in the bosh-plate, and in most cases the internal blast-furnace pressure, being greater than that of the water, will prevent the outflow of water at the breaks in the casting.

When sediment from the water collects in the passage of the plate sufficiently to impede its cooling action and to make it liable to burn out, I may force through the plate a stream of water under pressure, which will clean it thoroughly. This is made possible by the relatively large size of the water inlet and outlet pipes which I employ.

The advantages of my invention will be appreciated by the skilled blast-furnace engineer and need not be enumerated more particularly herein.

Many modifications in the form and construction of the parts of the apparatus may be made without variance from the scope of my invention, as stated in the following claims, each of which states a distinct item of invention unqualified by peculiar limitations contained in others.

I claim—

1. A bosh-plate set in the masonry of a furnace-wall and having a water-passage extending through it, and an elevated water-outlet pipe open and exposed at the upper end and having a lateral discharge-pipe, substantially as and for the purposes described.

2. A bosh-plate set in the masonry of a furnace-wall and having a water-passage extending through it, an exposed water-inlet opening, and an elevated water-outlet pipe open and exposed at the upper end and having a lateral discharge-pipe, substantially as and for the purposes described.

In testimony whereof I have hereunto set my hand this 6th day of August, A. D. 1891.

THOMAS M. POLLOCK.

Witnesses:
JAMES DAVIS,
J. R. WOOLEY.